· US007434386B2

United States Patent
Faas et al.

(10) Patent No.: US 7,434,386 B2
(45) Date of Patent: Oct. 14, 2008

(54) SYSTEM FOR MONITORING EXHAUST GAS CONCENTRATIONS

(75) Inventors: Julie M. Faas, Peoria, IL (US); James Joshua Driscoll, Dunlap, IL (US); Bryan Anthony Silletti, Edwards, IL (US); Maarten Verkiel, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 202 days.

(21) Appl. No.: 11/019,312

(22) Filed: Dec. 23, 2004

(65) Prior Publication Data

US 2006/0140819 A1 Jun. 29, 2006

(51) Int. Cl.
*F01N 3/00* (2006.01)
*F02B 27/04* (2006.01)
*G01N 21/00* (2006.01)
*F01N 7/14* (2006.01)

(52) U.S. Cl. .............................. 60/286; 60/272; 60/273; 60/276; 60/285; 422/62; 422/83

(58) Field of Classification Search .................. 422/83; 60/272, 276, 286, 299, 302, 311
See application file for complete search history.

(56) References Cited

U.S. PATENT DOCUMENTS

| | | | |
|---|---|---|---|
| 4,042,464 A | 8/1977 | Blurton et al. | |
| 4,127,462 A | 11/1978 | Blurton et al. | |
| 5,518,603 A | 5/1996 | Furuhashi et al. | |
| 5,897,759 A | 4/1999 | Kurosawa et al. | |
| 5,974,788 A * | 11/1999 | Hepburn et al. | 60/274 |
| 6,143,165 A | 11/2000 | Kurosawa et al. | |
| 6,277,256 B1 | 8/2001 | Garzon et al. | |
| 6,301,882 B1 * | 10/2001 | Manaka | 60/285 |
| 6,319,377 B1 | 11/2001 | Hasei et al. | |
| 6,413,397 B2 | 7/2002 | Hasei et al. | |
| 6,460,329 B2 * | 10/2002 | Shimotani et al. | 60/285 |
| 6,554,983 B2 | 4/2003 | Imamura et al. | |
| 6,722,125 B1 | 4/2004 | Pfalzgraf | |
| 6,779,339 B1 * | 8/2004 | Laroo et al. | 60/297 |
| 6,803,236 B2 | 10/2004 | Bailey et al. | |
| 2002/0108854 A1 | 8/2002 | Labarge et al. | |
| 2003/0136676 A1 | 7/2003 | Miwa et al. | |
| 2003/0172647 A1 * | 9/2003 | Tanaka | 60/286 |
| 2004/0040289 A1 | 3/2004 | Mazur et al. | |

* cited by examiner

*Primary Examiner*—Jill Warden
*Assistant Examiner*—Neil Turk
(74) *Attorney, Agent, or Firm*—Finnegan, Henderson, Farabow, Garrett & Dunner

(57) ABSTRACT

A system is provided for monitoring exhaust gas concentrations in an exhaust stream from an engine. The system may include the exhaust system configured to carry an exhaust stream generated by the engine. The system may further include at least one sensor in communication with the exhaust stream and configured to generate an output indicative of a concentration of NOx and a concentration of at least one sulfur-containing compound in the exhaust stream. The system may further include a controller configured to selectively produce one of a rich condition and a lean condition in the exhaust stream and to determine, during the rich condition, the concentration of the at least one sulfur-containing compound in the exhaust stream based on the output from the at least one sensor and to determine, during the lean condition, the concentration of NOx in the exhaust stream based on the output from the at least one sensor.

26 Claims, 2 Drawing Sheets

SYSTEM FOR MONITORING EXHAUST GAS CONCENTRATIONS

TECHNICAL FIELD

This disclosure pertains to systems for monitoring exhaust gas concentrations and, more particularly, to systems including sensors that are sensitive to both nitric oxides (NOx) and sulfur-containing compounds.

BACKGROUND

Work machines and/or vehicles may include various types of exhaust system emission components to regulate or reduce the amount of NOx compounds and other exhaust constituents released into the atmosphere. Diesel engine exhaust can include sulfur-containing compounds that may be trapped by exhaust system components, including NOx-adsorber catalysts. Over time, these trapped compounds may cause significant exhaust system sulfur contamination that can hamper the emission-controlling capability of the exhaust system.

To maintain exhaust system performance, sulfur contamination may be removed by periodic, rich regeneration. Rich regeneration may include operation of an engine with a rich air-to-fuel ratio at elevated temperatures. Removal of sulfur contamination by rich engine operation can, however, reduce the overall efficiency of an engine. Further, extended high temperature operation can cause a deterioration in the performance of exhaust system catalysts. Therefore, it may be useful to monitor exhaust system sulfur contamination and to desulfate only when necessary.

One method of monitoring exhaust system sulfur contamination is disclosed in U.S. Pat. No. 6,803,236, issued to Bailey on Apr. 12, 2004 (hereinafter the '236 patent). The method includes the use of multiple NOx sensors disposed at different locations within the exhaust system. The method further includes comparing the response time differentials of the multiple sensors to determine a level of sulfur compound contamination.

While the method of the '236 patent may provide an indication of exhaust system sulfur contamination, this method has several drawbacks. Particularly, the method requires multiple sensors. Further, the method may require multiple sensor types with different gas sensitivities and response times. While the method of the '236 patent may provide an indication of exhaust system sulfur contamination based on degradation of exhaust system catalyst performance, the method cannot provide a direct measure of exhaust gas sulfur-containing compounds.

The present disclosure is directed at overcoming one or more of the problems or disadvantages in the prior art.

SUMMARY OF THE INVENTION

One aspect of the present disclosure includes a system for monitoring exhaust gas concentrations in an exhaust stream from an engine. The system may include an exhaust system configured to carry the exhaust stream generated by the engine. The system may further include at least one sensor in communication with the exhaust stream and configured to generate an output indicative of a concentration of NOx and a concentration of at least one sulfur-containing compound in the exhaust stream. The system may further include a controller configured to selectively produce one of a rich condition and a lean condition in the exhaust stream and to determine, during the rich condition, the concentration of the at least one sulfur-containing compound in the exhaust stream based on the output from the at least one sensor and to determine, during the lean condition, the concentration of NOx in the exhaust stream based on the output from the at least one sensor.

A second aspect of the present disclosure includes a method for monitoring exhaust gas concentrations in an exhaust stream of an engine. The method may include producing a rich condition in the exhaust stream and monitoring an output of a sensor in fluid communication with the exhaust stream. The method may further include determining, during the rich condition, a concentration of at least one sulfur-containing compound of the exhaust stream based on the output from the sensor. The method may also include producing a lean condition in the exhaust stream and determining, during the lean condition, a concentration of NOx in the exhaust stream based on the output from the sensor.

A third aspect of the present disclosure includes a work machine. The work machine may include an engine, an exhaust system configured to carry an exhaust stream generated by the engine, and a system for monitoring exhaust gas concentrations in the exhaust stream. The system for monitoring exhaust gas concentrations may include at least one sensor in communication with the exhaust stream and configured to generate an output indicative of a concentration of NOx and a concentration of at least one sulfur-containing compound in the exhaust stream. The system may further include a controller configured to selectively produce one of a rich condition and a lean condition in the exhaust stream and to determine, during the rich condition, the concentration of the at least one sulfur-containing compound in the exhaust stream based on the output from the at least one sensor and to determine, during the lean condition, the concentration of NOx in the exhaust stream based on the output from the at least one sensor.

DETAILED DESCRIPTION

Figure 1:
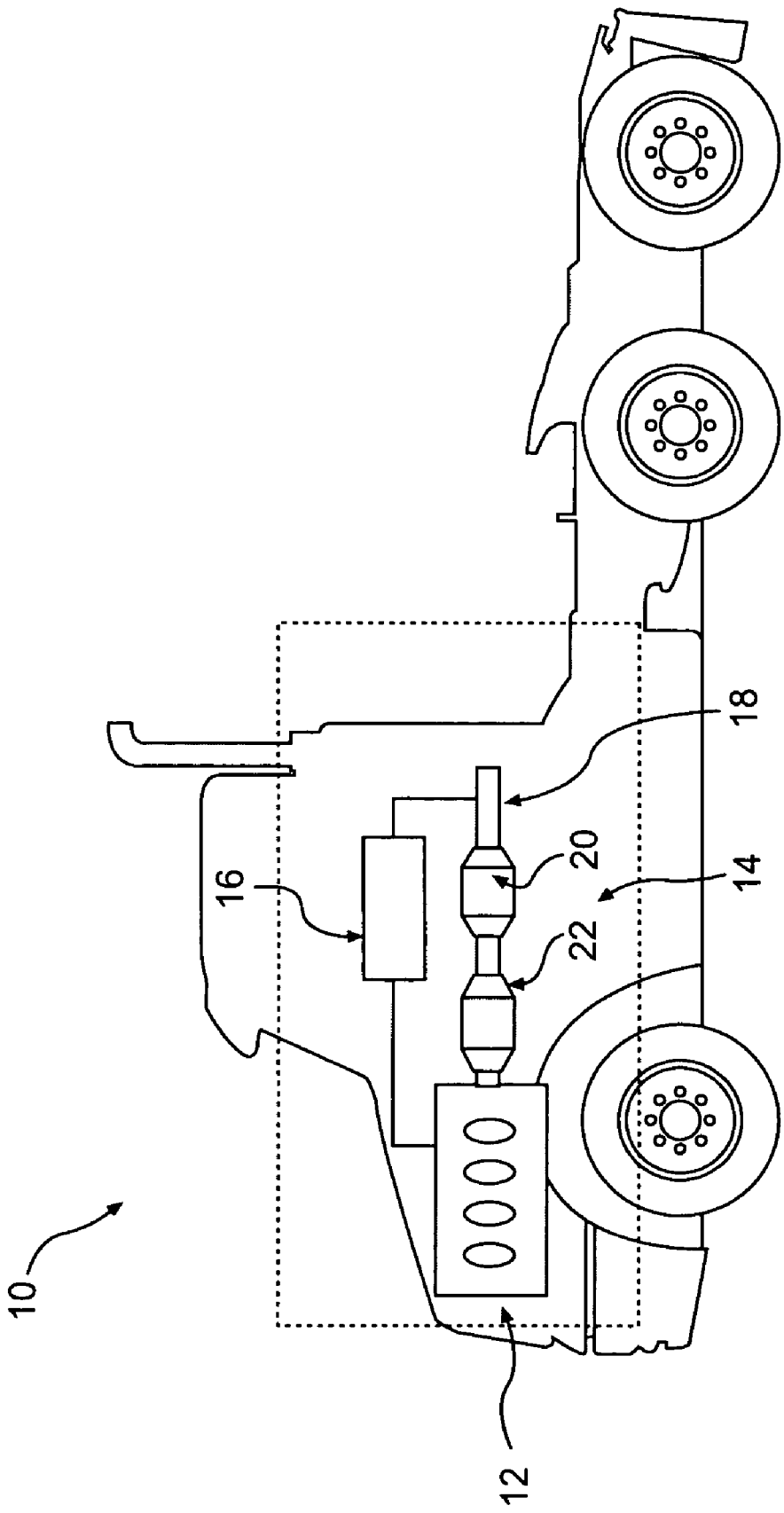
FIG. 1 provides a diagrammatic illustration of a work machine, according to an exemplary disclosed embodiment.

FIG. 1 illustrates a work machine 10, according to an exemplary disclosed embodiment. While work machine 10 is shown as a truck, work machine 10 may include any type of work machine including, for example, excavators, material handlers, backhoe loaders, graders, off-highway vehicles, tractors, and pipe layers. As illustrated, work machine 10 may include an engine 12, an exhaust system 14, and a system 16 for monitoring exhaust gas concentrations from engine 12. Exhaust system 14 may include an exhaust passage 18, a NOx-adsorber catalyst 20, and/or a three-way catalyst 22.

Engine 12 may provide power to work machine 10. This power may be derived from the combustion of fossil fuels, which may produce an exhaust gas stream. The exhaust gas stream produced by combustion in engine 12 may be delivered to exhaust system 14. The concentration of chemicals in the exhaust gas stream produced by engine 12 may be monitored by system 16, which may include a sensor 24 (FIG. 2) having sensitivity to both NOx and sulfur-containing compounds.

Engine 12 may have a number of operating modes. For example, engine 12 may operate with a variety of different air-to-fuel vapor ratios. The air-to-fuel vapor ratio in engine 12 may be expressed as a lambda value, which is derived from the stoichiometric air-to-fuel vapor ratio. The stoichiometric air-to-fuel vapor ratio may correspond to a chemically correct ratio for combustion to occur. A stoichiometric air-to-fuel vapor ratio may be considered to be equivalent to a lambda value of 1.0.

Engine 12 may operate at non-stoichiometric air-to-fuel vapor ratios. Particularly, when engine 12 has a higher level of fuel than needed for stoichiometric combustion, the lambda value is less than 1.0, and engine 12 is said to be operating in a rich mode. Further, when engine 12 has a lower level of fuel than needed for stoichiometric combustion, the lambda value is greater than 1.0, and engine 12 is said to be operating in a lean mode.

The air-to-fuel vapor ratio of engine 12 may be selected based on a number of desired performance characteristics. For example, the air-to-fuel vapor ratio of engine 12 may be selected to control fuel efficiency, power output, and/or the emission of combustion by-products. Lean operation may provide improved fuel efficiency compared to stoichiometric or rich operation. However, lean operation may increase the level of NOx produced by engine 12.

At other times, engine 12 may be operated in a rich mode. Rich operation may produce low NOx emissions, as compared to lean or stoichiometric operation. Further, rich operation may provide a higher power output from engine 12. However, rich operation of engine 12 may produce lower fuel efficiency as compared to lean or stoichiometric operation.

Figure 2:
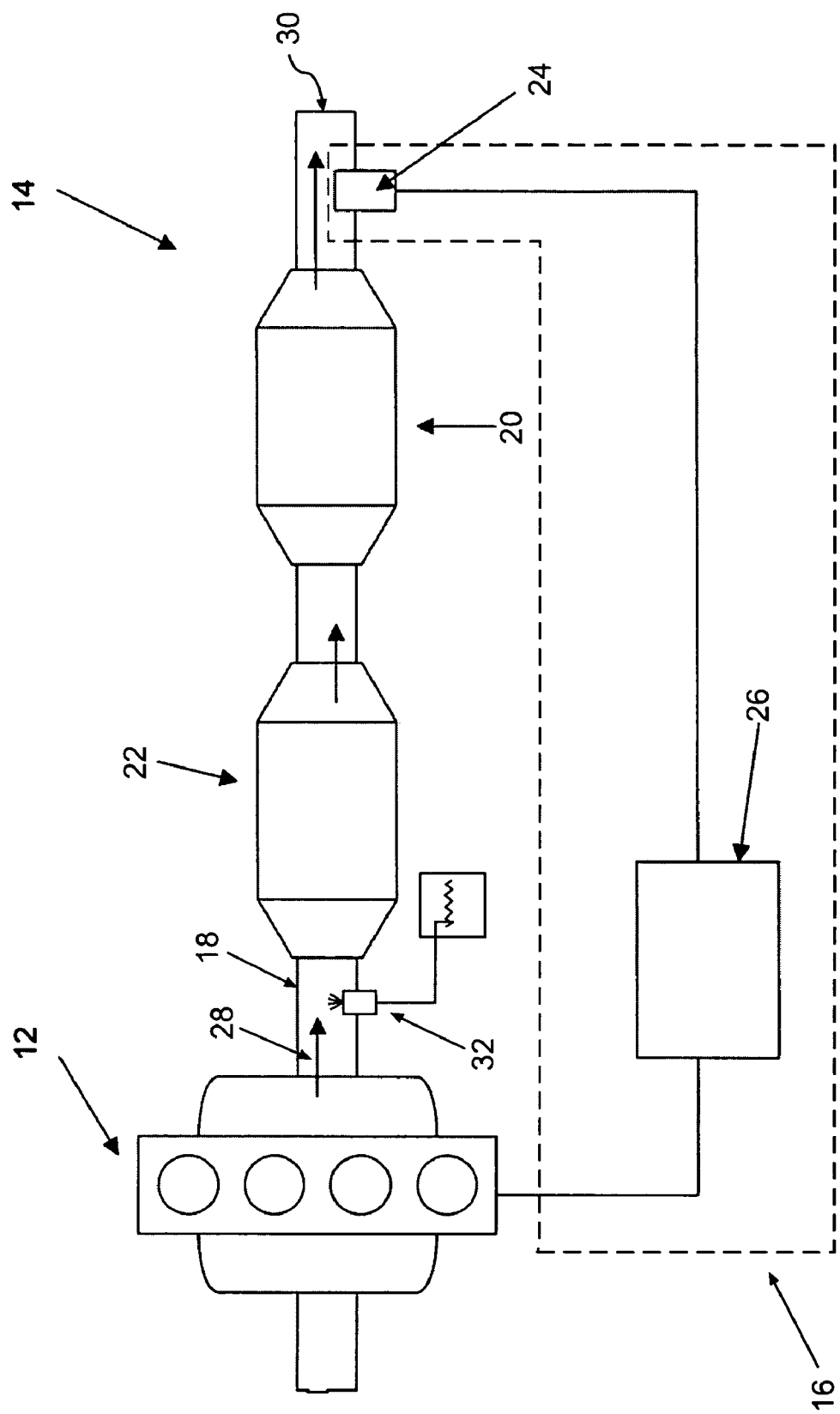
FIG. 2 provides a schematic diagram of a system for monitoring exhaust gas concentrations, according to an exemplary disclosed embodiment.

FIG. 2 provides a schematic diagram of an exemplary system for monitoring exhaust gas concentrations. As illustrated in FIG. 2, exhaust system 14 may include exhaust passage 18. Exhaust passage 18 may be configured to receive an exhaust gas stream 28 produced by engine 12. Exhaust passage 18 may direct exhaust gas stream 28 from engine 12 through a variety of subsystems in work machine 10. These subsystems may include forced-induction systems, cooling/heating systems, and/or emissions control systems. Exhaust passage 18 may fluidly communicate with an exit passage 30 configured to expel the exhaust gas stream from work machine 10. In addition, a fuel supply device 32 may be configured to supply fuel or other additives to exhaust gas stream 28.

Exhaust system 14 may include one or more filters or catalysts. These filters and catalysts may help control exhaust emissions. For example, filters or catalysts may be configured to control emissions of chemicals such as NOx, hydrocarbons, and/or sulfur-containing compounds. Exhaust system 14 may include any desirable filter and/or catalyst including, for example, NOx-adsorber catalyst 20, three-way catalyst 22, oxidation catalysts, diesel particulate filters, and/or selective catalytic reduction systems.

In one embodiment, exhaust system 14 may include NOx-adsorber catalyst 20. NOx-adsorber catalyst 20 may help control NOx emissions produced by engine 12. NOx-adsorber catalyst 20 may contain any catalyst material capable of collecting oxides of nitrogen on their outer surfaces. Such catalyst materials may include, for example, aluminum, platinum, radium, barium, cerium, or other alkali metals, alkali earth metals, or rare earth metals. The catalyst materials may be situated within NOx-absorber catalyst 20 so as to maximize the surface area available for NOx adsorption. Such configurations may include, for example, a honeycomb, mesh, or any other configuration known in the art. NOx-adsorber catalysts may also be called NOx traps, NOx sorbers, or NOx-absorber catalysts.

NOx-adsorber catalyst 20 may control NOx emissions produced during lean operation of engine 12. During lean operation, NOx-adsorber catalyst 20 may bind NOx produced by engine 12. After NOx-adsorber catalyst 20 has bound a predetermined amount of NOx, NOx-adsorber catalyst 20 may be exposed to a rich exhaust gas and/or a reductant. The rich exhaust gas and/or reductant may facilitate conversion of bound NOx into other chemicals, such as nitrogen gas and water.

In one embodiment, exhaust system 14 may also include a three-way catalyst 22. Three-way catalyst 22 may control emissions of carbon monoxide (CO), volatile organic compounds (VOCs), and/or NOx. Three-way catalyst 22 may include one or more catalytic materials including, for example, platinum, palladium, and/or rhodium. These materials may facilitate the conversion of CO, VOCs, and/or NOx into other chemicals such as carbon dioxide, water, and/or nitrogen gas.

NOx-adsorber catalyst 20 and three-way catalyst 22 may also bind a number of sulfur-containing combustion by-products produced by engine 12.

For example, engine 12 may produce one or more sulfur-containing compounds, including sulfur dioxide ($SO_2$), sulfur trioxide ($SO_3$), hydrogen sulfide ($H_2S$), and/or carbonyl sulfide (COS). These sulfur-containing compounds may be deposited on and bind to NOx-adsorber catalyst 20 and/or three-way catalyst 22. Over time, these sulfur-containing compounds may affect the emissions controlling capabilities of NOx-adsorber catalyst 20 and/or three-way catalyst 22. To maintain the performance of NOx-adsorber catalyst 20, three-way catalyst 22, and/or other components of exhaust system 14, sulfur-containing compounds may be periodically removed from components of exhaust system 14.

A number of desulfation processes may be used to remove sulfur-containing compounds from NOx-adsorber catalyst 20 and/or three-way catalyst 22. One such desulfation process may include producing rich conditions in an exhaust gas stream 28 within exhaust system 14. Rich exhaust conditions may facilitate the release of sulfur-containing compounds from NOx-adsorber catalyst 20, three-way catalyst 22, and/or other components of exhaust system 14. During desulfation, the release of the formerly trapped sulfur-containing compounds may cause the concentration of one or more sulfur-containing compounds in exhaust system 14 to increase.

Desulfation processes may also include heating one or more components of exhaust system 14. Heating may be accomplished by operating engine 12 at higher than normal temperatures or by directly heating NOx-adsorber catalyst 20 and/or three-way catalyst 22. For example, NOx-adsorber catalyst 20 and/or three-way catalyst 22 may be heated using electrical heaters disposed on or near NOx-adsorber catalyst 20 and/or three-way catalyst 22.

Returning to FIG. 2, system 16 may include sensor 24 and a controller 26. Sensor 24 may be configured to detect one or more chemical compounds in exhaust gas stream 28 within exhaust system 14. Controller 26 may be configured to control the air-to-fuel vapor ratio in exhaust gas stream 28.

Sensor 24 may be configured to detect a variety of chemicals in exhaust gas stream 28. For example, sensor 24 may be configured to detect NOx, sulfur-containing compounds, carbon monoxide (CO), and/or water. In one embodiment, sensor 24 may be configured to detect both NOx and at least one sulfur-containing compound in exhaust gas stream 28. The sulfur-containing compounds may include $SO_2$, $SO_3$, $H_2S$, and/or COS.

Sensor 24 may be located in a number of different locations and may be in fluid communication with at least a portion of exhaust gas stream 28. In one embodiment, sensor 24 may be disposed downstream of NOx-adsorber catalyst 20 and/or three-way catalyst 22. In this embodiment, sensor 24 may be able to detect chemicals released from NOx-adsorber catalyst 20 and/or three-way catalyst 22, including one or more sulfur-containing compounds.

Sensor 24 may be configured to produce an output indicative of the concentration of both NOx and at least one sulfur-containing compound in exhaust gas stream 28. For example, sensor 24 may produce a voltage or current which may be indicative of the concentration of both NOx and one or more sulfur-containing compounds. The voltage or current may be measured to determine the concentration of both NOx and one or more sulfur-containing compounds, including $SO_2$, $SO_3$, $H_2S$, and/or COS, in exhaust gas stream 28.

Under some conditions, exhaust gas stream 28 may contain a high concentration of NOx compared to the concentration of sulfur-containing compounds. For example, during lean operation of engine 12, engine 12 may produce a high level of NOx compared to rich or stoichiometric operation of engine 12. Unless the NOx produced by lean operation of engine 12 is removed by downstream enrichment and/or catalytic removal of NOx, lean operation of engine 12 may produce a lean, NOx-containing exhaust gas stream 28. Further, engine 12 may also produce one or more sulfur-containing compounds during lean operation. The concentration of the sulfur-containing compounds in exhaust gas stream 28 during lean operation, however, may be small compared to the concentration of NOx in exhaust gas stream 28. Thus, during lean operation, the output from sensor 24, which can be sensitive to both NOx and sulfur-containing compounds, may be used to determine the concentration of NOx in exhaust gas stream 28.

Under other conditions, the concentration of sulfur-containing compounds in exhaust gas stream 28 may by high compared to the concentration of NOx. For example, during rich operation, engine 12 may produce a low level of NOx compared to lean or stoichiometric operation of engine 12. Further, rich exhaust conditions, which may be produced by rich engine operation or by enrichment of exhaust stream 28 downstream from engine 12, may facilitate the release of one or more sulfur-containing compounds into exhaust gas stream 28 from NOx-adsorber catalyst 20 and/or three-way catalyst 22. The sulfur-containing compounds that may be released into exhaust passage 18 under rich exhaust stream conditions may result in a high concentration of sulfur-containing compounds compared to the concentration of NOx. Thus, under rich conditions of the exhaust stream, the output from sensor 24 may be used to determine the concentration of sulfur-containing compounds in exhaust gas stream 28.

Controller 26 may be configured to monitor and/or control a number of characteristics of exhaust gas stream 28. Controller 26 may include, for example, an electrical control unit (ECU) of work machine 10. Additionally, or alternatively, controller 26 may include one or more mechanically or chemically activated sensors and/or actuators.

In one embodiment, controller 26 may have a number of operational, maintenance, and/or diagnostic functions. For example, controller 26 may specify air-to-fuel vapor ratios and/or power output. Controller 26 may also monitor a number of engine operating characteristics, such as fuel efficiency and/or emissions levels. Controller 26 may vary engine operating parameters and exhaust stream conditions to control these characteristics.

Controller 26 may be configured to select two or more exhaust stream conditions. These exhaust stream conditions may include a rich condition and a lean condition. The exhaust stream condition may be selected based on desired operating characteristics of work machine 10 or to facilitate various diagnostic and/or maintenance procedures. For example, during normal operation, controller 26 may select a lean condition, which may improve fuel efficiency as compared to rich conditions. Alternatively, controller 26 may select a rich condition in order to facilitate exhaust system desulfation. Particularly, controller 26 may select a rich or lean condition in order to facilitate selective measurement of the concentration of NOx and one or more sulfur-containing compounds in exhaust gas stream 28.

Rich exhaust stream conditions may be produced in a number of ways. In one embodiment, the rich exhaust stream conditions may be produced by operating engine 12 with a rich air-to-vapor ratio. Controller 26 may control the air-to-fuel vapor ratio within one or more cylinders of engine 12 to produce a rich exhaust stream condition.

In another embodiment, a rich exhaust stream condition may be produced by supplying one or more additives to exhaust stream 28. The additives may include diesel fuel, gasoline, reductants, and/or combustion by-products. Controller 26 may select the rate that additivies are supplied to exhaust stream 28 based on desired exhaust stream characteristics. For example, the rate may be selected to control exhaust emissions, fuel-efficiency, and/or rate of exhaust system desulfation.

In one embodiment, fuel may be supplied to exhaust stream 28 through fuel supply device 32. Fuel supply device 32 may be fluidly connected with exhaust passage 18. Further, fuel supply device 32 may directly inject fuel into exhaust passage 18 and may be positioned at one or more different locations with respect to exhaust passage 18. In one embodiment, fuel supply device 32 may be disposed downstream of engine 12 and upstream of NOx-adsorber catalyst 20.

In another embodiment, fuel supply device 32 may be configured to alter the fuel before supplying the fuel to exhaust passage 18. For example, fuel supply device 32 may be configured to cause at least partial combustion of a diesel fuel and to release the combustion by-products into exhaust passage 18. Further, fuel supply device 32 may be configured to supply fuel to exhaust passage 18 upstream of an oxidation catalyst so that the fuel and other components of exhaust stream 28 may be at least partially oxidized before reaching NOx-absorber catalyst 20.

Controller 26 may be configured to determine the concentration of NOx and/or sulfur-containing compounds in exhaust gas stream 28 based on an output from sensor 24. In one embodiment, controller 26 may be configured to select a lean exhaust stream condition and to determine the concentration of NOx based on the output of sensor 24 during the lean exhaust stream condition. Further, controller 26 may be configured to select a rich exhaust stream condition and to determine the concentration of at least one sulfur-containing compound based on the output of sensor 24 during the rich exhaust stream condition.

Controller 26 may also be configured to determine whether or not exhaust system desulfation is needed based on an output from sensor 24 during a rich exhaust stream condition. The output of sensor 24 during the production of rich exhaust stream conditions may be indicative of the concentration of one or more sulfur-containing compounds in exhaust gas stream 28. A concentration of one or more sulfur-containing compounds that meets or exceeds a predetermined level may indicate that exhaust system 14 contains a certain level of sulfur contamination. Engine controller 26 may be configured to maintain the rich condition until the output from sensor 24 falls below a predetermined level, indicating that desulfation has been adequately performed. Further, when the output from sensor 24 is below a predetermined level, engine controller 26 may return to producing a lean exhaust stream condition.

Controller 26 may periodically select and produce an exhaust stream condition based on predetermined time intervals or engine operating characteristics. For example, in one embodiment, controller 26 may select a lean exhaust stream condition as a default condition. Controller 26 may periodically switch from the default, lean condition to a rich condition. The periodic selection of a rich condition may be based on a number of criteria. For example, in one embodiment, controller 26 may select a rich condition to assess a level of exhaust system sulfur contamination and/or to provide exhaust system desulfation.

In operation, controller 26 may select and produce a rich condition in exhaust stream 28 based on exhaust gas concentrations in exhaust gas stream 28. For example, excess sulfur contamination may impair the NOx-adsorbing capacity of NOx-adsorber catalyst 20. The impaired NOx-adsorbing capacity of NOx-adsorber catalyst 20 may produce increased NOx concentrations in exhaust gas stream 28. Therefore, in one embodiment, controller 26 may specify a lean condition as a default condition, and if NOx concentrations in exhaust gas stream 28 meet or exceed a predetermined level, controller 26 may determine that desulfation may be needed and may select and initiate a rich exhaust stream condition.

Initiation of a rich condition may cause a transient release of NOx and/or other chemicals into exhaust gas stream 28 that can affect the accuracy of sensor 24. Therefore, in certain embodiments, controller 26 may be configured to wait for a predetermined period of time after the initiation of a rich condition before determining the concentration of one or more sulfur-containing compounds. For example, controller 26 may be configured to wait between about 5 seconds and 1 minute after initiation of a rich condition before determining the concentration of at least one sulfur-containing compound in exhaust stream 28.

INDUSTRIAL APPLICABILITY

The present disclosure provides a system for monitoring NOx concentrations and sulfur concentrations in the exhaust streams of an internal combustion engine or any other type of exhaust producing device. The system can be used in any type of work machine that produces at least one of NOx and sulfur-containing compounds.

System 16 of the present disclosure includes a single sensor 24 for measuring both NOx and sulfur-containing compound concentrations in an engine exhaust gas stream 28. Sensor 24 may be sensitive to both NOx and one or more sulfur-containing compounds, and therefore, system 16 may provide concentration information for both NOx and sulfur-containing compounds without the need for multiple sensors. System 16, including sensor 24, may reduce the number of parts needed to monitor exhaust emissions, thereby improving system reliability and reducing costs. It should be noted that while one sensor 24 may be sufficient to determine concentration information of both NOx and sulfur containing species, system 16 may include any number of sensors 24. For example, multiple sensors 24 may be distributed among various locations in exhaust system 14 to determine the NOx and sulfur concentrations at different locations in exhaust system 14.

System 16 of the present disclosure may provide improved emissions control and fuel efficiency for work machine 10. System 16 can monitor NOx emissions levels and exhaust system sulfur contamination to determine when exhaust system desulfation is necessary. By closely monitoring exhaust system sulfur contamination and desulfating only when necessary, the system of the present disclosure may reduce the time spent in inefficient desulfation modes, thereby improving overall engine efficiency and preventing catalyst deactivation due to high temperature desulfation.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A system for monitoring exhaust gas concentrations in an exhaust stream from an engine, comprising:
   an exhaust system configured to carry the exhaust stream from the engine;
   a sensor in communication with the exhaust stream, the sensor configured to generate an output indicative of a concentration of NOx and a concentration of at least one sulfur-containing compound in the exhaust stream; and
   a controller configured to:
     selectively produce one of a rich condition and a lean condition in the exhaust stream;
     determine, during the rich condition, the concentration of the at least one sulfur-containing compound in the exhaust stream based on the output from the sensor; and
     determine, during the lean condition, the concentration of NOx in the exhaust stream based on the output from the sensor.

2. The system of claim 1, wherein the rich condition is provided by operating the engine with a rich air-to-fuel ratio within one or more engine cylinders.

3. The system of claim 1, wherein the rich condition is provided by supplying fuel to the exhaust stream.

4. The system of claim 1, wherein the controller is further configured to:
   determine if the output from the sensor, during the rich condition, meets or exceeds a predetermined level; and
   maintain the rich condition as long as the output from the sensor, during the rich condition, meets or exceeds the predetermined level.

5. The system of claim 1, wherein the controller is further configured to wait for a predetermined period of time after initiation of the rich condition before determining the concentration of the at least one sulfur-containing compound.

6. The system of claim 1, wherein the controller is further configured to:
   selectively produce a lean condition in the exhaust stream for a predetermined period of time;
   selectively produce a rich condition in the exhaust stream; and
   return to producing the lean condition in the exhaust stream if the output from the sensor, during the rich condition, meets or exceeds a predetermined level.

7. The system of claim 1, wherein the controller is further configured to:
   selectively produce a lean condition in the exhaust stream; and
   selectively produce a rich condition in the exhaust stream if the output from the sensor, during the lean condition, meets or exceeds a predetermined level.

8. The system of claim 1, wherein the at least one sulfur-containing compound includes at least one of sulfur dioxide, sulfur trioxide, carbonyl sulfide, and hydrogen sulfide.

9. The system of claim 1, further including a NOx-adsorber catalyst, wherein the sensor is disposed downstream of the NOx-adsorber catalyst.

10. A method for monitoring exhaust gas concentrations in an exhaust stream of an engine comprising:
producing a rich condition in the exhaust stream;
monitoring an output of a sensor in fluid communication with the exhaust stream;
determining, during the rich condition, a concentration of at least one sulfur-containing compound of the exhaust stream based on the output of the sensor during the rich condition;
producing a lean condition in the exhaust stream; and
determining, during the lean condition, a concentration of NOx in the exhaust stream based on the output of the sensor during the lean condition.

11. The method of claim 10, wherein the rich condition is provided by operating the engine with a rich air-to-fuel ratio within one or more engine cylinders.

12. The system of claim 10, wherein the rich condition is provided by supplying fuel to the exhaust stream.

13. The method of claim 10, further including:
determining if the output from the at least one sensor, during the rich condition, meets or exceeds a predetermined level; and
maintaining the rich condition as long as the output from the at least one sensor, during the rich condition, meets or exceeds the predetermined level.

14. The method of claim 10, further including maintaining the rich condition for a predetermined period of time before determining the concentration of the at least one sulfur-containing compound.

15. The method of claim 10, further including:
selectively producing a lean condition in the exhaust stream for a predetermined period of time;
selectively producing a rich condition in the exhaust stream; and
returning to producing the lean condition in the exhaust stream if the output from the at least one sensor, during the rich condition, meets or exceeds a predetermined level.

16. The method of claim 10, further including:
selectively producing a lean condition in the exhaust stream; and
selectively producing a rich condition in the exhaust stream if the output from the at least one sensor, during the lean condition, meets or exceeds a predetermined level.

17. The method of claim 10, wherein the at least one sulfur-containing compound includes at least one of sulfur dioxide, sulfur trioxide, carbonyl sulfide, and hydrogen sulfide.

18. A work machine comprising:
an engine;
an exhaust system configured to carry an exhaust stream generated by the engine; and
a system for monitoring exhaust gas concentrations in the exhaust stream, including:
a sensor in communication with the exhaust stream, the sensor configured to generate an output indicative of a concentration of NOx and a concentration of at least one sulfur-containing compound in the exhaust stream; and
a controller configured to:
selectively produce one of a rich condition and a lean condition in the exhaust stream;
determine, during the rich condition, the concentration of the at least one sulfur-containing compound in the exhaust stream based on the output from the sensor; and
determine, during the lean condition, the concentration of NOx in the exhaust stream based on the output from the sensor.

19. The work machine of claim 18, wherein rich condition is provided by operating the engine with a rich air-to-fuel ratio within one or more engine cylinders.

20. The work machine of claim 18, wherein the rich condition is provided by supplying fuel to the exhaust stream.

21. The work machine of claim 18, wherein the controller is further configured to:
determine if the output from the sensor, during the rich condition, meets or exceeds a predetermined level; and
maintain the rich condition as long as the output from the sensor, during the rich condition, meets or exceeds the predetermined level.

22. The work machine of claim 18, wherein the controller is further configured to wait for a predetermined period of time after initiation of the rich condition before determining the concentration of the at least one sulfur-containing compound.

23. The work machine of claim 18, wherein the controller is further configured to:
selectively produce a lean condition in the exhaust stream for a predetermined period of time;
selectively produce a rich condition in the exhaust stream; and
return to producing the lean condition in the exhaust stream if the output from the sensor, during the rich condition, meets or exceeds a predetermined level.

24. The work machine of claim 18, wherein the controller is further configured to:
selectively produce a lean condition in the exhaust stream; and
selectively produce a rich condition in the exhaust stream if the output from the sensor, during the lean condition, meets or exceeds a predetermined level.

25. The work machine of claim 18, wherein the at least one sulfur-containing compound includes at least one of sulfur dioxide, sulfur trioxide, carbonyl sulfide, and hydrogen sulfide.

26. The work machine of claim 18, further including a NOx-adsorber catalyst, wherein the sensor is disposed downstream of the NOx-adsorber catalyst.

* * * * *